United States Patent [19]

Engle et al.

[11] Patent Number: 4,772,048

[45] Date of Patent: Sep. 20, 1988

[54] MULTIPLE PLY DOCUMENT

[75] Inventors: John R. Engle, Kettering, Ohio; Donald B. Shenberger, Corbin, Ky.

[73] Assignee: NCR Corporation, Dayton, Ohio

[21] Appl. No.: 930,823

[22] Filed: Nov. 14, 1986

[51] Int. Cl.[4] .......................... B41L 1/24; B41L 1/20; B41L 5/04; G06K 19/00

[52] U.S. Cl. .............................. 282/9 R; 282/11.5 A; 282/11.5 R; 235/487

[58] Field of Search ............... 281/5; 282/6, 8 R, 9 R, 282/10, 11.5 A, 11.5 R, 21 R, 22 R; 235/476, 487, 494

[56] References Cited

U.S. PATENT DOCUMENTS

| | | | |
|---|---|---|---|
| 2,286,094 | 6/1942 | Hollingsworth | 282/11.5 R |
| 4,136,895 | 1/1979 | McKinzie et al. | 282/9 R |
| 4,168,851 | 9/1979 | Halse | 282/11.5 A |
| 4,283,622 | 8/1981 | Passer et al. | 235/487 |
| 4,311,325 | 1/1982 | Steidinger | 282/9 R |
| 4,343,492 | 8/1982 | Fitzgibbons . | |
| 4,375,382 | 3/1983 | Steidinger | 282/11.5 A |
| 4,614,362 | 9/1986 | Breen et al. | 282/9 R |
| 4,625,909 | 12/1986 | Ferrando | 282/11.5 A |

FOREIGN PATENT DOCUMENTS 0174771 3/1986 European Pat. Off. .

*Primary Examiner*—E. R. Kazenske
*Assistant Examiner*—Paul M. Heyrana, Sr.
*Attorney, Agent, or Firm*—Wilbert Hawk, Jr.; Albert L. Sessler, Jr.; George J. Muckehthaler

[57] ABSTRACT

A multiple ply document for receiving recording information including a top ply having a machine readable code printed thereon, a bottom ply secured by means of a line of adhesive to the top ply adjacent one edge thereof, a line of weakening in the top ply distal from the line of adhesive to permit removal of a portion of the first ply, and at least one middle ply extending to a position adjacent the line of weakening and secured to the bottom ply by means of a line of adhesive adjacent the line of weakening.

15 Claims, 1 Drawing Sheet

MULTIPLE PLY DOCUMENT

BACKGROUND OF THE INVENTION

In present-day data processing systems, the use of bar code symbols on labels or articles is well known as a means for acquiring data at a point of sale or other business transaction. The bar code symbol on the article or label is read by scanning apparatus to provide data such as the identification and price of the article. Of course, additional data may be required of the system in the overall arrangement depending on the complexity of the business operation.

The bar code symbol is used on documents such as guest checks for hotels, dining facilities or the like where the information concerning items of food and/or drinks is entered or recorded on the check and the bar code symbol is read by a reader for processing the information.

While the format and arrangement of printed information on the guest check varies for each business establishment, certain information is desirable to provide a record of the transactions. The printed information on the guest check may include the name and address of the business, the server, table, number of persons, time, date or other like information.

It is also known that the guest checks may comprise a single sheet or ply on which is printed the essential information, with a bar code symbol being printed in an appropriate machine readable location. A portion of the check generally is easily removable along a line of perforations for issuing to the guest and which portion includes a record of the service and transaction.

The guest check may comprise a back or bottom ply on which is printed the essential information along with a printed bar code symbol, and a front or top ply which is secured to the back or bottom ply by means of a line of adhesive or the like. The front or top ply may extend over a portion or all of the back or bottom ply and is removable therefrom by the server or cashier for the desired use.

Another arrangement comprises a multiple ply guest check which includes the printed information including the bar code symbol on all the plies and wherein the plies are secured together by means of a line of adhesive along one edge of the guest check.

Representative documentation relating to multiple ply business forms includes U.S. Pat. No. 4,343,492, issued to G. W. Fitzgibbons on Aug. 10, 1982, which discloses first and second superimposed plies of paper each having an information receiving portion. One ply is completely slit adjacent one edge and an easily releasable glue line secures the two plies together adjacent the slit.

SUMMARY OF THE INVENTION

The present invention relates to multiple ply documents for use in business establishments. More particularly, the present invention relates to guest checks on which is printed certain information and which includes space for recording information in addition to space occupied by a printed bar code symbol.

The multiple ply guest check includes a back or bottom ply of a weight which is sufficient to generally support itself and which is known as or termed a heavyweight ply. A front or top ply of lighter weight or a lightweight ply of the same size as the back ply is secured thereto along one edge so as to leave three free edges. The front ply has a line of weakening spaced from the one edge so as to enable removal of a lower portion of the front ply. A middle or intermediate ply is secured by means of a low-tack line of glue to the back ply in the vicinity of the line of weakening and is easily removable from the back ply. As a modification, a plurality of intermediate plies may each be secured by means of low-tack glue in the vicinity of the line of weakening, to be easily removeable from an adjacent ply.

A bar code symbol is printed in one corner of the top ply and is positioned to be read by a reader for processing of the guest checks. The portion of the front ply on which is printed the bar code symbol is secured to the back ply in the vicinity of the line of weakening so as to remain with the front ply when either the top ply or the top ply and the middle ply are removed from the guest check back ply.

In view of the above discussion, the principal object of the present invention is to provide a multiple ply document printed for machine reading and having at least one ply, or a portion of another ply, removable from the document.

Another object of the present invention is to provide a multiple ply guest check having a bar code symbol printed on one ply thereof, which bar code symbol remains on the one ply when a portion of the one ply, or another ply, is removed from the guest check.

An additional object of the present invention is to provide a multiple ply guest check having a ply with one portion on which is printed a bar code symbol and having an additional portion of said ply removable from the guest check leaving the portion with the printed bar code symbol.

A further object of the present invention is to provide a multiple ply guest check having a front ply and a back ply of substantially the same size and secured to each other along one edge, the front ply having a first portion with a bar code symbol printed thereon, and having one or more removeable intermediate plies, and a second portion of the front ply removable from the guest check.

Additional advantages and features of the present invention will become apparent and fully understood from a reading of the following descriptien taken together with the annexed drawing.

DESCRIPTION OF THE PREFERRED EMBODIMENT

Figure 1:
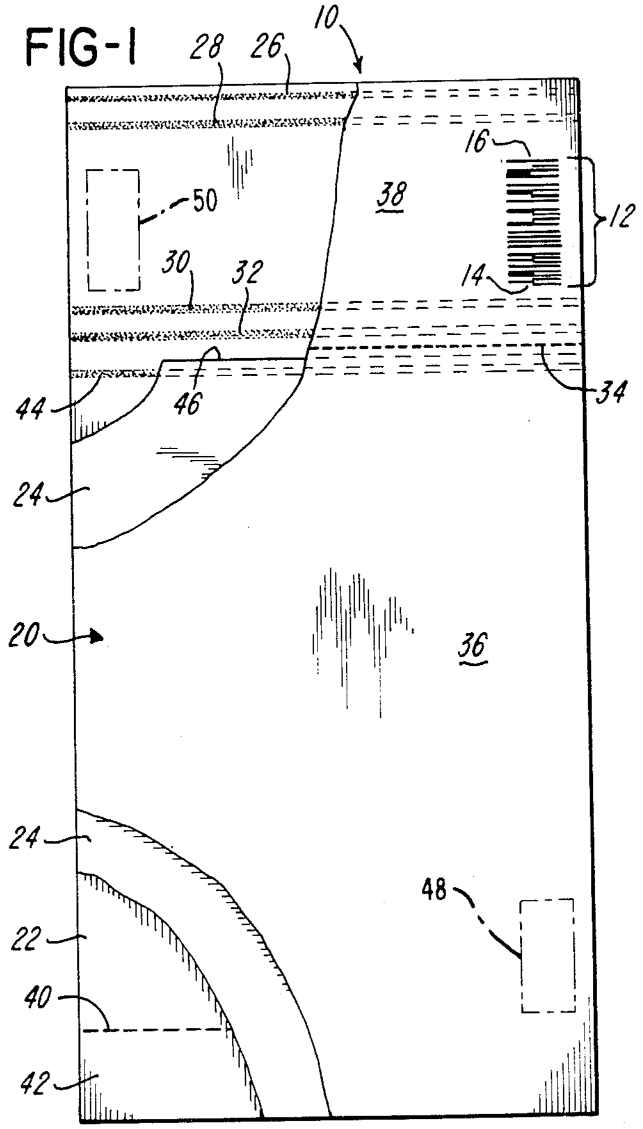
FIG. 1 is a top or plan view of a guest check incorporating the subject matter of the present invention.

Referring to FIG. 1 of the drawing, there is shown a top or front view of a record member 10 such as a guest check which is used or issued by a motel or hotel or other business establishment and on which customer charges are recorded. Upon registration at the motel or hotel, or upon being provided a service or items of consumption, the customer is assigned a guest check 10 on which is printed a bar code symbol 12. The bar code symbol 12 comprises a left hand data channel portion 14 including a plurality of lines of different widths spaced to provide, machine readable indicia, such as an account number, and a right hand portion 16 that is used as a clocking channel, the overall arrangement forming a personal account number assigned to the customer and readable to process the various transactions.

A preferred bar code design and application thereof are disclosed in U.S. Pat. Nos. Des. 261,007, issued to B. E. Passer et al. on Sept. 29, 1981; 4,259,569, issued to B. E. Passer et al. on Mar. 31, 1981; and 4,283,622 issued to B. E. Passer et al. on Aug. 11, 1981, all assigned to the assignee of the present invention.

Any charges that are incurred by the customer are entered on the guest check 10 by inserting the check into the printing mechanism of a terminal or like device (not shown) and entering the amount of the charge into the printing mechanism through a keyboard in a manner that is well-known in the art. A drive member in the terminal device drives the guest check 10 to a position adjacent the printing members of the printing mechanism which prints the amount of the charge. During an initial movement of the guest check 10 into the terminal device, a reader or like sensing member reads the bar code symbol 12 and enables the terminal device to identify the customer's account number so that the amount being printed is identified as belonging to such customer. After verifying the account number, the terminal device notifies the operator to enter the amount of the charge into the keyboard, after which the printing operation is performed. At check-out time, the total amount of the charge or charges on the guest check 10 is added and printed for payment by the customer.

Figure 2:
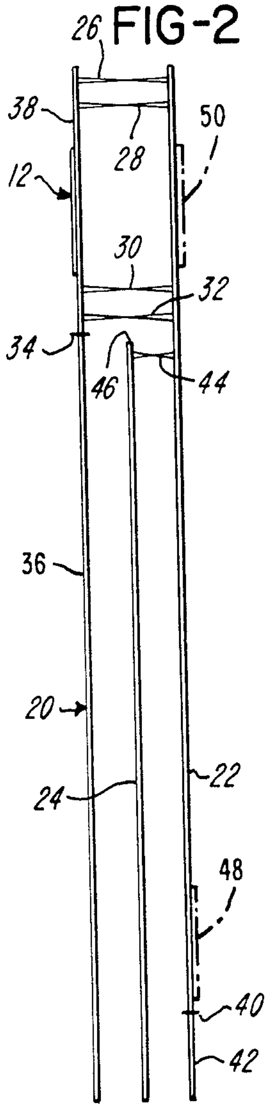
FIG. 2 is a side view of the guest check with the several plies being separated in exaggerated manner to show the construction.

The guest check 10 comprises a plurality of plies which are formed and arranged in a unique manner to provide an advantageous document for use in business operations. The guest check 10 includes a top or front ply 20 of relatively lightweight paper and of rectangular form, and a bottom or back ply 22 of relatively heavyweight paper and also of rectangular form and essentially corresponding in size with the front ply. At least one middle or intermediate ply 24 of relatively lightweight paper, also of rectangular shape, extends from the lower edges of the top and bottom plies 20, 22 to a position up approximately three-fourths of the length of the guest check, as illustrated in FIG. 2. The top and bottom plies 20, 22 are full length plies with removable portions, as described below.

The top or front ply 20 is CB (coated back) carbonless transfer paper which is secured to the bottom or back ply 22 by means of a double line or spaced lines 26, 28 of adhesive along and between the upper edges of the two plies. A second pair of spaced lines 30, 32 (or a double line) of adhesive are positioned at a distance down from the first lines 26, 28 and thereby secure the top and bottom plies at a second area of attachment. A line of weakening 34 comprising a fine line of perforations is provided adjacent the second lines 30, 32 of adhesive and is below the line 32, as illustrated in FIG. 2. The fine-perforated line 34 provides for easy removal of a lower portion 36 of the front ply 20 and leaves a substantially smooth edge on the remaining upper portion 38 of the front ply.

The back or bottom ply 22 is CF (coated front) carbonless transfer paper which is of one piece construction except for a lower portion 42 which is removable along a line of weakening 40 comprising a line of perforations to provide a stub portion 42 of the transaction. The portion 42 may be used by the customer as a record of the transaction or of the total of the transactions (if more than one).

The middle or intermediate ply 24 (a short length ply) is CFB (coated front and back) carbonless transfer paper and is secured to the back ply 22 by means of a line of adhesive 44 positioned below the line of adhesive 32, as shown in FIG. 2. It is also seen that the upper edge 46 of the middle ply 24 is slightly below the line of weakening 34 of the front ply 20. The adhesive used along line 44 is a low-tack glue to permit easy removal of the middle ply 24 from the back ply 22. While FIGS. 1 and 2 show the parts in exaggerated manner, it is advantageous to maintain the glue lines 30, 32 as close as possible to the edge 46 of the middle ply 24 and to the line of weakening 34 to minimize catching or snagging of the edges during machine-reading operations. Depending upon the orientation of the guest check 10 when inserted into the reading apparatus, alternate locations, as at 48 or 50 on the back side of the guest check 10, may be provided for the bar code symbol 12.

While a preferred arrangement of the present invention includes the use of CF, CB, and CFB paper for the several plies, it, of course, is within the scope of this invention to provide plain paper for the plies and to use carbon paper therebetween for transmitting the information to the successive plies.

The multiple ply form 10 is constructed in collated manner by applying the several glue lines, die cutting the lines of perforation, and letterpress crash imprinting the bar code symbol on the portion 38 of the top ply 20.

When a person uses this multiple ply form, items of data or information can be written on the face of the top ply 20 along with machine printing of desired data or information. An image of such writing and/or printing appears on the middle ply 24 and on the bottom ply 22. The guest check is then inserted into the terminal for machine reading of the bar code symbol 12 to effect a transaction. The lower portion 36 of the top ply 20 can be removed along the fine perforated line 34, leaving the upper portion 38 with the bar code symbol 12 thereon. After one or more additional transactions, the middle ply 24 can be removed from the bottom ply 22 by pulling along the line of low-tack glue 44 without disturbing the upper portion 38 of the top ply 20. The remaining bottom ply 22 then can be inserted into the terminal for reading the bar code symbol 12. The structure of the guest check 10 permits the bar code symbol 12 to be read with one, two, three or more plies on the check.

It is thus seen that herein shown and described is a multiple ply document for receiving data or information, which comprises a front ply on which is printed a bar code symbol, a back ply of comparable size and secured to the front ply, and an intermediate ply of lesser size than the front and back plies and secured to the back ply. Of course, more than one intermediate ply may be provided to form or make up a unit set type guest check. A portion of the front ply can be removed along a line of weakening, and the intermediate ply can be removed along the line of adhesive which secures it to the back ply. The upper portion of the front ply on which is printed the bar code symbol remains with the document and allows the form to be used and the bar code symbol to be read with one, two, or all three plies.

The printing of the bar code symbol 12 only on the portion 38 of the top ply 20 eliminates any problems which may be caused by paper dust collecting on the steel bar code numbering wheels of the printing mechanism if the printing was performed on the CFB and the CF sheets of paper. The paper dust on the numbering wheels could result in smudging of the bar code symbol 12. The printing of the bar code symbol 12 only on the top ply 20 also eliminates any problem of "see-through" reading in the case where symbols are printed on more than one ply and shifting of the plies could cause a slight advance or a delay in reading the proper bar code with a resulting error in the transaction.

The guest check 10 of the present invention provides for two types of glue, a permanent type along lines 26, 28, 30, 32 and a low-tack glue along the line 44. The fine perforated line 34 leaves a smooth edge when the lower portion 36 of the top ply 20 is removed, and the bar code symbol 12 need be printed only one time while enabling reading thereof when one, two, three or more plies are present.

The document of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

We claim:

1. A business form comprising a first ply having information printed thereon, a second ply of essentially the same size as said first ply and secured to the first ply by first continuous securing means along one edge thereof and by second continuous securing means spaced from said first continuous securing means, the first ply having a line of weakening adjacent the second continuous securing means and spaced farther from said first continuous securing means than from said second continuous securing means and permitting removal of a portion of the first ply, and at least one third ply having one edge thereof aligned with one edge of said first ply and with one edge of said second ply, said third ply being of lesser size than said first ply and said second ply and secured to said second ply by third continuous securing means adjacent said second continuous securing means and having another edge adjacent said third continuous securing means and spaced farther from said second continuous securing means than from said line of weakening, the selective removal of the first ply portion or said at least one third ply leaving another portion of the first ply with the information thereon between said first securing means and said second securing means remaining with the form.

2. The business form of claim 1 wherein the first ply is of one weight material and the second ply is of a heavier weight material.

3. The business form of claim 1 wherein the information printed on the first ply includes a bar code symbol.

4. The business form of claim 1 wherein each of the first and second continuous securing means comprises a line of adhesive.

5. The business form of claim 1 wherein the second ply includes a line of weakening spaced from one edge thereof permitting removal of a portion of the second ply.

6. The business form of claim 1 wherein the second plug includes information printed on the back side thereof, the printed information on the back side including a bar code symbol.

7. The business form of claim 1 wherein the first ply includes a coating on the back side thereof for transferring record information, the third ply includes a coating on the front side thereof for receiving the record information and a coating on the back side thereof for transferring the record information, and the second ply includes a coating on the front side thereof for receiving the record information.

8. A business form comprising a front ply having information printed thereon, a back ply of essentially the same size as said front ply and secured to the front ply by first securing means along one edge thereof and by second securing means spaced from said first securing means, the front ply having a line of weakening adjacent the second securing means and spaced farther from said first securing means than from said second securing means and permitting removal of a lower portion of the front ply, and at least one intermediate ply having one edge theroef aligned with one edge of said front ply and with one edge of said back ply, said intermediate ply being of lesser size than said front ply and said back ply and secured to the back ply by third securing means adjacent the second securing means and having an edge adjacent said third securing means and spaced farther from said second securing means than from said line of weakening, the selective removal of the lower portion of the front ply or said at least one intermediate ply leaving the upper portion of the front ply with the printed information thereon between said first securing means and said second securing means remaining with the back ply.

9. The business form of claim 8 wherein the front ply is of one weight material and the back ply is of a heavier weight material.

10. The business form of claim 8 wherein the information printed on the front ply includes a bar code symbol.

11. The business form of claim 8 wherein the first and second securing means each comprises a line of adhesive.

12. The business form of claim 8 wherein the back ply includes a line of weakening spaced from one edge thereof permitting removal of a lower portion of the back ply.

13. The business form of claim 8 wherein each of the first and the second securing means comprises a double line of continuous adhesive.

14. The business form of claim 8 wherein the third securing means comprises a line of low-tack adhesive.

15. The business form of claim 8 wherein the at least one intermediate ply includes an edge adjacent the line of weakening of the front ply.

* * * * *

UNITED STATES PATENT AND TRADEMARK OFFICE

CERTIFICATE OF CORRECTION

PATENT NO. : 4,772,048

DATED : September 20, 1988

INVENTOR(S) : John R. Engle et al.

It is certified that error appears in the above-identified patent and that said Letters Patent is hereby corrected as shown below:

Column 6, line 4, delete "plug" and substitute --ply--.

Column 6, line 26, delete "theroef" and substitute --thereof--.

Signed and Sealed this

Seventh Day of February, 1989

*Attest:*

DONALD J. QUIGG

*Attesting Officer* *Commissioner of Patents and Trademarks*